No. 733,205.

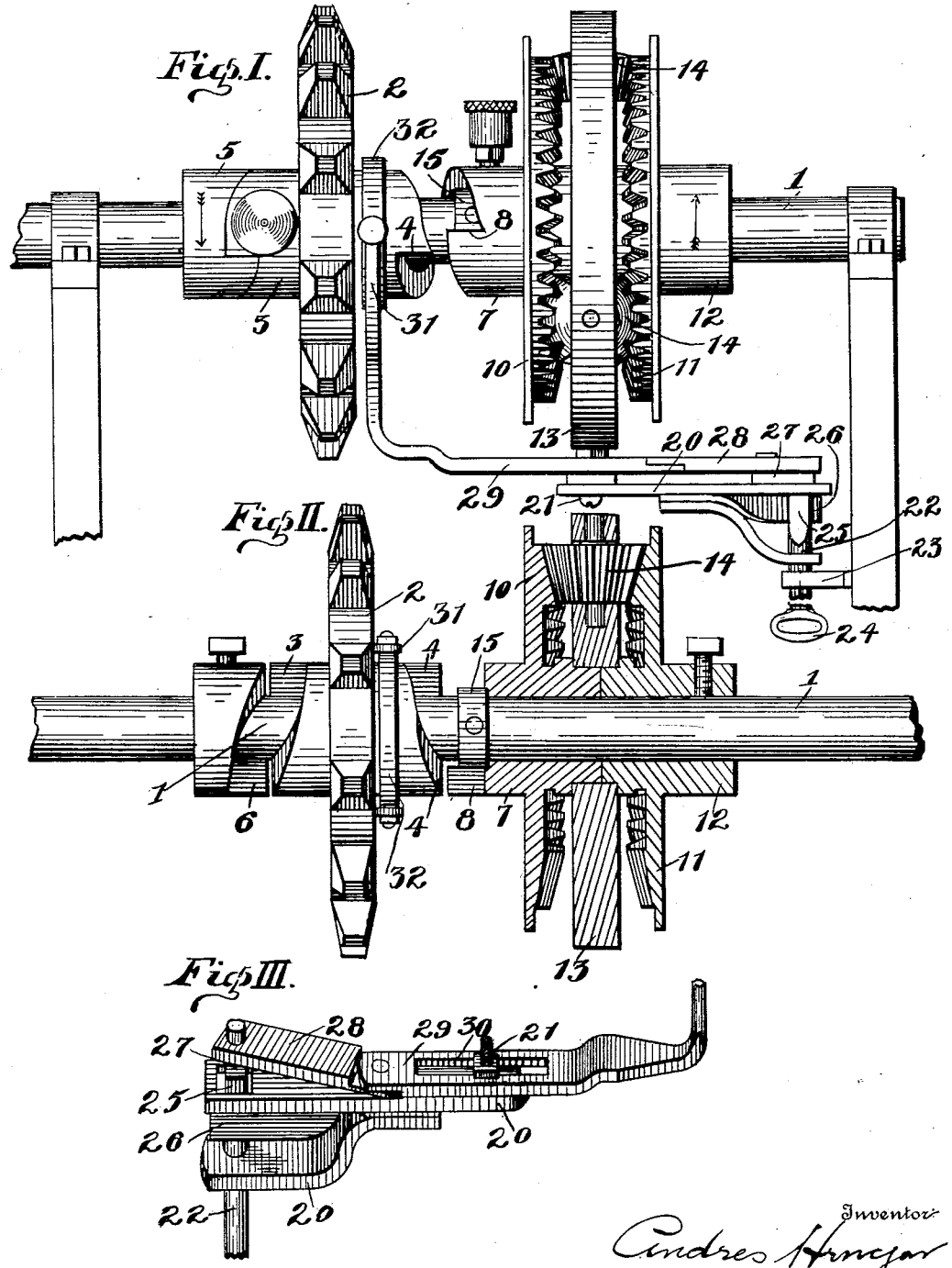

Patented July 7, 1903.

UNITED STATES PATENT OFFICE.

ANDRES HRNCJAR, OF ROANOKE, ILLINOIS.

REVERSING-GEARING.

SPECIFICATION forming part of Letters Patent No. 733,205, dated July 7, 1903.

Application filed February 20, 1903. Serial No. 144,302. (No model.)

*To all whom it may concern:*

Be it known that I, ANDRES HRNCJAR, a citizen of the United States, and a resident of Roanoke, Woodford county, State of Illinois, have invented certain new and useful Improvements in Reversing-Gearing; and my preferred manner of carrying out the invention is set forth in the following full, clear, and exact description, terminating with claims particularly specifying the novelty.

This invention relates to machine elements, and more especially to that class of devices therein known as "reversing-gearing;" and the object of the same is to produce mechanism mounted on a driven shaft and so constructed as to permit said shaft to stand idle or to be driven in either direction by a power-wheel mounted loosely on the shaft and rotating constantly in one direction.

To this end the invention consists in the details set forth below and illustrated in the drawings, wherein—

Figure I is an elevation of this device complete, showing the clutch members connected to drive the shaft in the same direction as the power-wheel. Fig. II is a plan view, partly in section, showing all clutch members out of connection. Fig. III is a detail of the lever mechanism.

In the drawings the numeral 1 is a shaft to which machinery is connected, and 2 is a driving-wheel, here shown as a sprocket whose hub is mounted loosely on the shaft and has clutch-teeth 3 and 4 at its opposite ends. Fixed upon the shaft at one side of this hub is a collar 5, having teeth 6, and when the latter are engaged by the teeth 3 the shaft is driven positively in the direction indicated by the arrow on this collar. Loosely surrounding the shaft at the other side of the power-wheel 2 is a collar 7, having teeth 8, and when the latter are engaged with the teeth 4 it is obvious that this collar will be turned in the same direction as the power-wheel, as also indicated by the arrow on the collar 5.

The collar 7 is the hub of a gear-wheel 10, and a companion gear-wheel 11 is fixed by its hub 12 on the shaft 1. Between these two gear-wheels stands a disk 13, mounted loosely on the shaft, and in this disk are journaled several counter-gears 14, which connect the inwardly-facing teeth of the two gears 10 and 11. Hence when the collar 7 turns in one direction as driven by the power-wheel the disk 13 stands idle and the gear 11, with its hub or collar 12, turns in the other direction, as indicated by the arrow thereon. This hub 12 is mounted fast on the shaft 1, and the collar or hub 7 of the other gear-wheel 10 is held to its place by a ring 15, which is fast on the shaft, against a shoulder within the collar 7, as seen in Fig. II. A suitable washer may be interposed between the two hubs 7 and 12; but as the hub of the disk 13 performs the function of holding the two gears properly spaced this detail need not be illustrated.

While any suitable form of lever mechanism may be employed to slide the hub of the power-wheel 2 upon the shaft 1, I prefer the mechanism best illustrated in Fig. III. In the construction therein shown a bracket 20 is fixed by a screw or bolt 21 to the edge of the disk 13, and in this bracket is mounted a shaft 22, which may have an additional bearing or guide 23. The shaft extends to within reach of the operator, where it has a handle 24, and within the bracket it is preferably squared, as at 25, and a spring 26 bears on this portion, so as to frictionally hold the shaft in one of several positions. The upper end of the shaft has a crank 27, which is pivotally connected by a link 28 with a slide 29. The body of the latter has a slot 30, by which it is guided over the screw 21, and its outer end is formed into a fork 31, pivoted to a collar 32, which stands in a groove in the hub of the power-wheel 2. When the handle 24 is turned, the crank 27 through the link 28 moves the slide in a manner which will be clear, and the fork slides the power-wheel longitudinally on the shaft without interrupting its rotation, which is constant and in one direction. When the crank 27 stands at right angles to the length of the slide, the fork holds the wheel in an intermediate position, so that the teeth of its hubs are disengaged from both collars, and the shaft is therefore driven in neither direction. Obviously the turning of the crank-shaft in one direction or the other will throw the teeth on the hubs of the power-wheel into engagement with those on either the collar 5 or the collar 7. As above stated, the former collar causes the shaft to turn with the power-wheel; but the rotation of the collar 7 causes the shaft, by means of the counter-gears 14, connecting the two large gears 10 and 11, to rotate in the opposite direction.

All parts are of the desired sizes, shapes, and materials, and considerable change in the details of construction may be made without departing from the principle of my invention.

What is claimed as new is—

1. In a device of the character described, the combination with a driven shaft, the driving-wheel having toothed hubs mounted loosely thereon and rotating constantly, means for sliding it in either direction, and toothed collars at opposite sides thereof, one of them fixed on the shaft; of a hub fixed on the shaft at the other side of the driving-wheel, gearing between this hub and the loose collar, and a ring fixed on the shaft against a shoulder within said collar for holding the elements of the gearing in operative position.

2. In a device of the character described, the combination with a driven shaft, the driving-wheel having toothed hubs mounted loosely thereon and rotating constantly, and toothed collars at opposite sides thereof, one of them fixed on the shaft; of a hub fixed on the shaft at the other side of the driving-wheel, gearing between this hub and the loose collar, means for holding the latter in position to keep the elements of the gearing in connection, a slide having a fork loosely engaging the hub of the driving-wheel, a crank-shaft for moving and setting this slide, and a guide for the slide mounted in a stationary element of said gearing.

3. In a device of the character described, the combination with a driven shaft, the driving-wheel having toothed hubs mounted loosely thereon and rotating constantly, and toothed collars at opposite sides thereof, one of them fixed on the shaft; of a hub fixed on the shaft at the other side of the driving-wheel, gearing between this hub and the loose collar, the same comprising a gear fixed on said hub, a second gear fixed to said collar, a disk mounted loosely on the shaft between said gears, and counter-gears journaled in the disk and each engaging both said other gears; and means for moving the driving-wheel longitudinally on the shaft consisting of a slotted slide having a fork engaging the hub of said wheel, crank mechanism for moving this slide longitudinally, a bracket for said mechanism, and a supporting-pin for the bracket passing through the slot in the guide and taking into said disk.

4. In a device of the character described, the combination with a driven shaft, a driving-wheel rotating loosely thereon and having toothed hubs, a toothed collar fast on the shaft at one side of the wheel, a toothed collar loose on the shaft at the other side, a hub fast on the shaft beyond this collar, and gearing connecting said hub with the loose collar, said gearing including a non-rotary disk mounted loosely on the shaft; of a bracket, a screw holding it to said disk, a crank-shaft journaled in the bracket and having a squared portion, a spring therein resting on such portion, a link engaging the crank, a slotted slide pivoted to the link and guided over said screw, and a fork on the slide engaging a groove in the hub of the driving-wheel.

In testimony whereof I have hereunto subscribed my signature this the 18th day of February, A. D. 1903.

ANDRES HRNCJAR.

Witnesses:
JOHN GUNTER,
JOE FULL.